Figure 1:
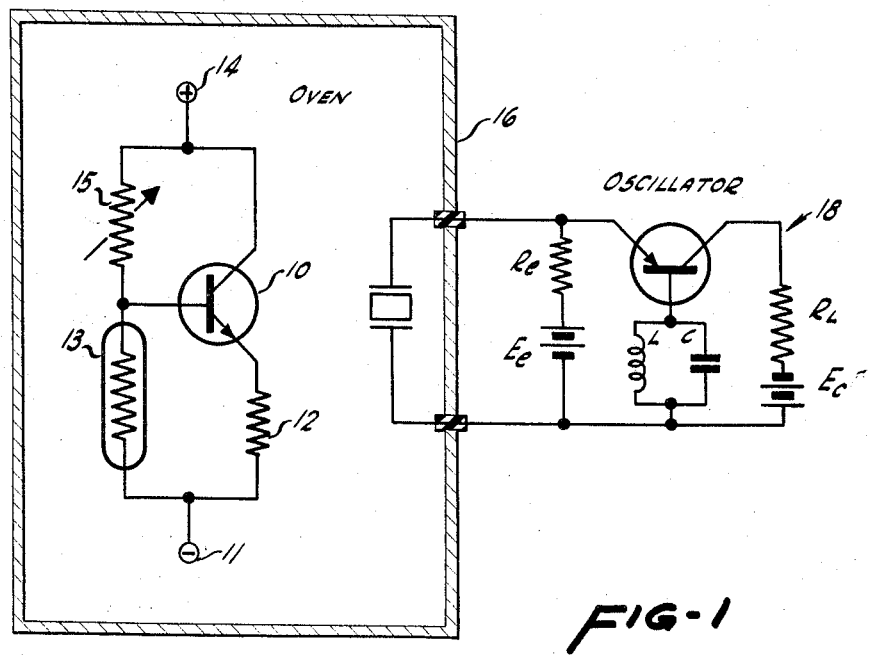

Jan. 24, 1967  G. J. SMYRNOS  3,300,623

CRYSTAL OVEN HEATING AND CONTROL SYSTEM

Filed May 27, 1959

INVENTOR.
GUS J. SMYRNOS
BY
Lippincott & Ralls
ATTORNEYS

United States Patent Office 3,300,623
Patented Jan. 24, 1967

---

3,300,623
CRYSTAL OVEN HEATING AND CONTROL SYSTEM
Gus J. Smyrnos, Sunnyvale, Calif., assignor, by mesne assignments, to Automatic Electric Laboratories, Inc., Northlake, Ill., a corporation of Delaware
Filed May 27, 1959, Ser. No. 816,200
7 Claims. (Cl. 219—501)

This invention relates to means for stabilizing temperature sensitive components and more particularly to temperature control circuits for crystal ovens.

Piezoelectric crystals of various sorts have been used in circuits of oscillators, accelerometers and such for many years. The successful use of crystals in these applications depends, in many cases, on controlling the ambient temperature in which they operate since they are extremely sensitive to variations in temperature. While a given crystal, as used in an oscillator circuit, for example, provides an accurate source of a preselected frequency at a design temperature, its characteristics both within and without the circuit become quite erratic if the temperature is varied to any appreciable extent.

Temperature control and regulating means have been supplied for crystal-type temperature-sensitive elements in the past, but most of them have used separate devices to heat the oven, to detect temperature changes, and to regulate the heat. That is to say, ordinarily there is supplied a source of heat, means for detecting variations in temperature, and means responsive to the detecting means for controlling the heat source to raise or lower the heat input. This technique controls the ambient temperature at which a crystal or other sensitive type of device operates in most cases, but it requires an excess of circuit components and regulation techniques.

The present invention reaches a result similar to prior-art types of regulating and control systems, but does so in a substantially simpler and superior manner. The present invention takes advantage of characteristics more or less unique to transistors to provide a regulating and control circuit wherein the heat source, the means responsive to variations in the temperature and the control means are incorporated into a single unit, which unit effects a substantial simplification of circuit components. Transistors are useful since they provide a usefully variable heat source due to their solid structure. Vacuum tubes and other types of regulator devices also dissipate heat, but are obviously unsuited to the purposes envisioned by the present invention.

The present invention provides a simple and straightforward circuit wherein the heat dissipation of one or more transistors and their related circuit components are used to maintain a crystal oven at a preselected temperature. Means are provided integral with the transistor circuit to vary the heat dissipation rate of the transistor in accordance with the tendency of the temperature in a crystal-controlled oven to change. Thus, the instant invention substantially eliminates the need for a separate source of heat and means to control the source. In the present case, the physical structure of transistors is employed in an economical way to satisfactorily control a system for the maintenance of a preselected ambient temperature in which crystals and the like are designed to operate.

Therefore, the object of the present invention is to provide a circuit to control the ambient temperature in a crystal oven which is simple in design, straightforward in operation, and economical in manufacture.

A feature of the invention pertains to the use of a transistor heat source which cooperates with temperature-sensitive means to control the temperature in a crystal oven by varying the heat dissipation of the transistor and its connected circuit components.

More particularly, a feature of the present invention pertains to the use of a thermistor in the base circuit of one or more transistors for the purpose of varying the collector current flowing through the transistor inversely with respect to increases or decreases of the ambient temperature in which the transistor operates.

Yet another feature of the invention pertains to a switching transistor which controls the heat dissipation of a power transistor in response to changes in leakage current resulting from temperature increases in the ambient atmosphere.

Figure 2:
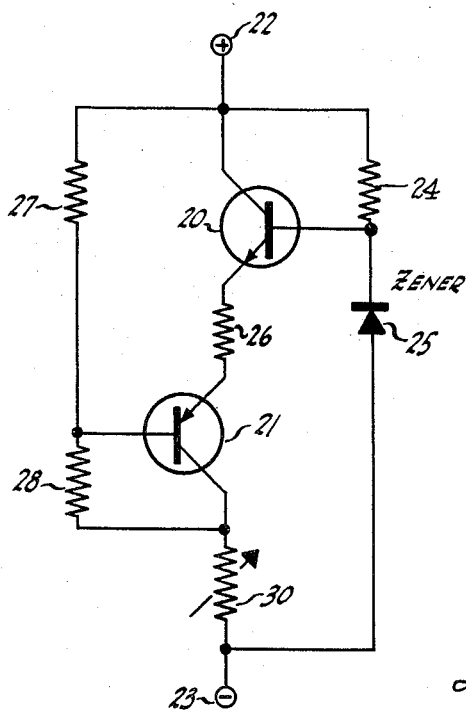

Other objects and features of the invention will be more fully understood when the following detailed description is read with reference to the drawings in which:

FIG. 1 is an exemplary embodiment of the present invention controlling the ambient temperature in which a crystal of a transistor oscillator is placed; and, FIG. 2 is an alternative embodiment of a control system for a crystal oven.

Turning to the exemplary embodiment of FIG. 1, it can be seen that the N-P-N transistor 10, including conventionally illustrated emitter, collector and base terminals, is connected in a grounded emitter configuration. A negative terminal 11 of any convenient D.C. voltage supply is connected to the emitter of the transistor 10 through external emitter resistance 12 and to the base of transistor 10 through a temperature-sensitive resistor or thermistor 13. The positive terminal 14 of the D.C. voltage supply is connected directly to the collector of transistor 10 and is connected through a variable resistor 15 to the base of the transistor 10. Thermistor 13 and resistor 15 act as a voltage divider to set the base voltage level. The overall circuit just described is included in a crystal oven 16 which also includes a piezoelectric crystal 17 operating with an exemplary oscillator 18. Proper operation of the crystal oscillator requires that the oven be properly insulated and that the conductors leading from the crystal 17 to the oscillator 18 be properly insulated as they course the wall of the oven 16.

The biasing of the N-P-N transistor 10 is such that it may operate as an amplifier, and the relative values are chosen so that as the thermistor 13 senses the tendency of the temperature in the oven to decrease, it increases in resistance. This raises the base voltage of the transistor 10 and, correspondingly, its emitter voltage. Raising these voltags permits more current to flow through the transistor 10 from the emitter to collector. The increased flow of current through the transistor 10 causes it and resistor 12 to dissipate an increasing amount of heat which compensates for the tendency of the oven temperature to decrease, as sensed by the thermistor element 13. Contrariwise, when the thermistor element 13 detects a tendency of the temperature in the oven 16 to increase, its effective resistance is reduced. This lowers the base voltage and, correspondingly, the emitter voltage of transistor 10. This limits current flow through the transistor 10 with the result that the heat dissipation of the transistor 10 is decreased. This decreases the oven temperature and hence returns the system to an equilibrium condition. Naturally, the minimum resistance of the thermistor 13 should be greater than emitter resistor 12 since it would change the bias on the emitter-base of transistor 10 and force most current to flow through the base, an undesirable result.

The variable resistor 15 is initially adjusted in order to select a reference temperature for operation of the oven. It is, of course, obvious in putting together a circuit to provide temperature control for a crystal oven 16 that it is necessary to select a transistor 10 which has heat dissipation capabilities to maintain the crystal oven 16 at the desired temperature. Logically enough, if the oven must be maintained at a temperature which requires more heat than the transistor and its circuit components are capable of dissipating, it cannot hope to maintain close control over the ambient temperature in which the crystal 17 operates. With this limitation, however, the desired transistor-control circuit for maintaining the ambient temperature of the oven 16 constant acts in the exemplary manner.

Turning to the second embodiment of the present invention, depicted in FIG. 2, it can be seen that a pair of transistors 20 and 21 are provided which cooperate in a manner similar in result to that of the FIG. 1 circuit. Nonetheless, by using a pair of transistors it is possible to overcome the upper temperature limit of the exemplary embodiment of FIG. 1. By controlling power transistor 20 by a switching or other type of transistor 21, a higher heat dissipation rate in the crystal oven 16 is obtainable. Hence, the operating range or capabilities of the system may be enhanced. N-P-N power transistor 20 has its base, emitter and collector terminals biased for amplifier operation in cooperation with a D.-C. voltage supply having a positive terminal 22 and a negative terminal 23, a dropping resistor 24, and a Zener diode 25. The emitter of the transistor 20 is connected through resistor 26 to the emitter of the P-N-P transistor 21. Positive supply terminal 22 is connected through a bleeding resistor 27 to the base of transistor 21 which, in turn, is connected through resistor 28 to the collector of transistor 21, which is connected through a variable resistor 30 to ground.

The terminals of transistor 21 are biased for conventional grounded-collector amplifier operation in accordance with the P-N-P type. The base is somewhat negative with respect to the emitter bias and positive with respect to the collector. The operation of this particular embodiment is as follows: Initially the resistor 30 is varied in order to set a reference operation point. Variation of resistor 30 determines the voltage drop across it and, hence, the proportion of the voltage drop between the emitter of transistor 21 and negative supply terminal 23 that will be across resistor 30. This in turn controls the base and emitter voltages of transistor 21, and thus controls the current flow through resistor 26 and transistor 20, since the base voltage of transistor 20 is kept substantially constant by Zener diode 25. With the voltage drop across resistor 30 set, the heat dissipated by the transistors 21 and 20 and their associated resistors will at least maintain the crystal oven 16 at or above a preselected ambient temperature. The greatest heat production occurs at the collector junction of power transistor 20 because the circuit is designed to provide the greatest voltage drop across this junction.

Whenever the temperature inside the oven 16 tends to increase due to outside conditions or as a result of excessive heat dissipation within the oven 16, the leakage current effectively flowing from the base to collector of transistor 21 will increase. Since the collector current flowing in transistor 21 is the sum of the emitter, base, and leakage currents, the current flowing through resistor 30 will increase. This increases the voltage drop across resistor 30, and raises the base and emitter voltages of transistor 21. Consequently, the voltage across resistor 26 decreases, and the current through resistor 26 and power transistor 20 must decrease proportionately. When the voltage drop across resistor 26 approaches zero, power transistor 20 cuts off, which cuts off the principal source of oven heat. Due to the fact that the base and emitter volages of power transistor 20 are maintained substantially constant due to the use of the Zener diode 25 in the biasing circuit, the emitter voltage of transistor 21, or, what is the same thing, the voltage drop available across the interconnecting resistor 26 largely determines the amount of current flowing in the heat dissipative components.

In this alternative embodiment it can be appreciated that there is little effective control available if the dissipative heat load is not sufficient to maintain the temperature in the crystal oven 16 at least at the minimum required temperature. Then too, transistor 21 must be temperature sensitive, preferably of germanium. The temperature stability of a silicon transistor hardly fits it for the task. Also, the leakage characteristic of the transistor 21 must be dovetailed with the temperature level desired in the crystal oven 16 in which it is to function. It is also apparent that this alternative embodiment acts more like a temperature switch than a variable control circuit as described in connection with the first embodiment. To this extent, it is, perhaps, a less versatile circuit.

While two exemplary embodiments have been described, it will be obvious to those skilled in the art that numerous other arrangements can be devised without departing from the spirit and scope of the invention. What the present invention is concerned with is the use of a temperature control circuit wherein the transistors not only constitute the heat source but the regulatory means as well. This concept is common to both exemplary embodiments although each differs with respect to its operation and usefulness for the intended function.

What is claimed is:

1. A system for maintaining the ambient temperature in a crystal oven at or below a preselected level comprising, in combination, a principal heat source with said oven, said heat source consisting essentially of cascaded switching and power transistors biased for amplifier operation, means to maintain the emitter of said power transistor at substantially constant potential, means to set the saturation point of said switching transistor, and means including the leakage current flowing in said switching transistor responsive to the tendency of the temperature in oven to exceed a preselected temperature level to drive said switching transistor to cut off thereby interrupting the current flowing through the transistor heat source system.

2. A system for maintaining the ambient temperature in a crystal oven at a preselected level comprising, in combination, a heat source within said oven, said heat source consisting essentially of an N-P-N power transistor having an emitter, a collector and a base, means to bias said power transistor for amplifier operation, means including a Zener diode connecting with the base of said power transistor to maintain the base and the emitter thereof at substantially constant potentials, a P-N-P switching transistor within said oven and responsive to oven temperature having an emitter, a collector and a base, the emitter of said switching transistor connected through a resistor to the emitter of said power transistor, means to bias said switching transistor for amplifier operation, means variable to establish a predetermined voltage drop across said switching transistor, and means including the leakage current flowing in said switching transistor to reduce said voltage drop thereby interrupting the current flow through said switching and power transistors when the temperature in the crystal oven tends to exceed a preselected temperature level.

3. A heating and temperature control system for a crystal oven, comprising a principal heat source within said oven, said heat source consisting essentially of at least one power transistor having emitter, collector and base terminals, a temperature sensitive element within said oven and responsive to oven temperature, a D.-C. power supply connected as a source of current to said transistor, means controlled by said temperature sensitive element for varying the base voltage of said transistor inversely with the temperature of said sensitive element, thereby controlling the current flowing through said transistor so that the heat dissipated from said transistor is of such an amount that a constant oven temperature is maintained.

4. A heating and temperature control system as in claim 3 wherein said temperature sensitive element is a thermistor.

5. A heating and temperature control system for a crystal oven, comprising a principal heat source within said oven, said heat source consisting essentially of at least one power transistor having an emitter, a collector, and a base, a D.-C. power supply having a first terminal connected to said collector and a second terminal connected to said emitter through a resistor, a resistor connected between said base and said first terminal to establish the basic level of current flow in said transistor for supplying heat to the oven, a thermistor within said oven and connected between said base and said second terminal, said thermistor varying the base voltage of said transistor inversely as the oven temperature changes, thereby varying the current flowing through said transistor as necessary from the basic level so that the heat dissipated therefrom maintains a constant oven temperature.

6. A heating and temperature control system for a crystal oven, comprising a principal heat source within said oven, said heat source consisting essentially of at least one power transistor having an emitter, a collector, and a base, a D.-C. power supply having a first terminal connected to said collector and a second terminal connected to said emitter through a resistor, a variable resistor connected between said base and said first terminal to establish a basic level of current flow in said transistor for supplying heat to the oven, means to vary said variable resistor to establish the required basic current level, a thermistor within said oven and connected between said base and said second terminal, said thermistor varying the base voltage of said transistor inversely as the oven temperature changes, thereby varying the current flowing through said transistor as necessary from the basic level so that the heat dissipated therefrom maintains a constant oven temperature.

7. A heating and temperature control system for a crystal oven, comprising a D.-C. power supply having a first and a second terminal, a heat source within said oven, said heat source consisting essentially of an N-P-N power transistor having an emitter, a collector and a base, said power transistor base connecting to said first terminal through a resistor, said power transistor collector connecting to said first terminal, a Zener diode connecting between said power transistor base and said second terminal to maintain a constant voltage at said base, a P-N-P switching transistor within said oven and having a leakage current responsive to oven temperature and having an emitter, a collector and a base, said switching transistor base connected to said first terminal through a resistor and to said switching transistor collector through a resistor, a variable resistor connected between said switching transistor collector and said second terminal to control the base and emitter voltages of said switching transistor, said switching transistor emitter connected to said power transistor emitter by a resistor within said oven, whereby a change of leakage current from the base to collector of said switching transistor due to a temperature change in said oven will vary the current through said emitters inversely with any temperature change and maintain a constant oven temperature.

References Cited by the Examiner

UNITED STATES PATENTS

| | | | |
|---|---|---|---|
| 2,693,572 | 11/1954 | Chase | 307—88.5 |
| 2,870,310 | 1/1959 | Van Overbeek | 219—10.77 |
| 2,872,556 | 2/1959 | Obermaier | 219—499 |
| 2,889,499 | 6/1959 | Rutz | 250—211 X |
| 2,892,143 | 6/1959 | Sommer | 307—88.5 |
| 2,932,714 | 4/1960 | Merrill | 219—501 |
| 2,938,130 | 5/1960 | Noll | 317—235 |
| 2,967,924 | 1/1961 | Friend | 219—501 |
| 2,975,260 | 3/1961 | Carlson | 219—501 |
| 3,002,802 | 10/1961 | Rich | 346—76 |

OTHER REFERENCES

Sutcliffe: Transistor Temperature Controller, Electronics, March 28, 1958, pp. 81–84.

Clark: Proceedings of the I.R.E., June 1958, pp. 1185–1204.

RICHARD M. WOOD, *Primary Examiner.*

WALTER STOLWEIN, MAX L. LEVY, *Examiners.*

L. H. BENDER, *Assistant Examiner.*